June 13, 1950 — A. RUBIN — 2,511,082
EDIBLE FOOD PRODUCT
Filed June 25, 1948
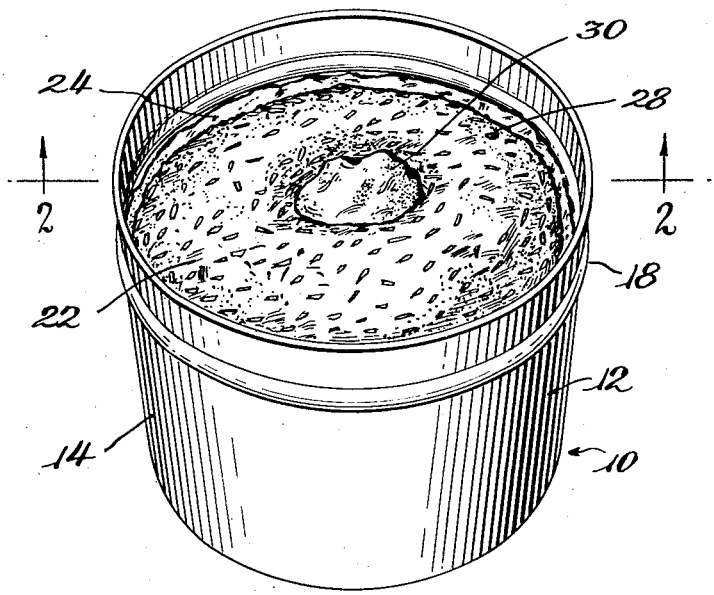
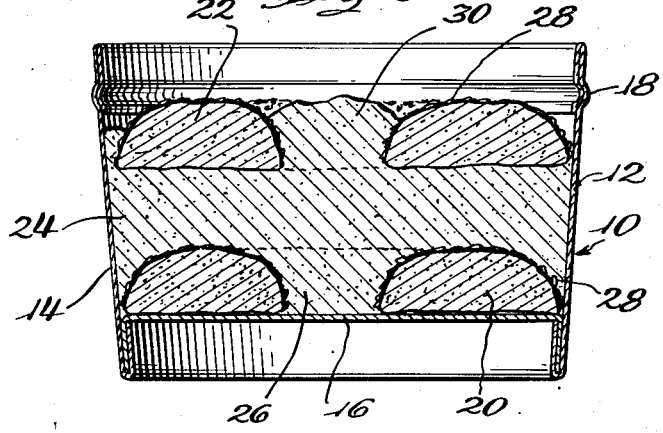
Inventor
Alfred Rubin
By Mason, Kolehmainen, Rathburn & Wyss
Attorneys Patented June 13, 1950

2,511,082

UNITED STATES PATENT OFFICE 2,511,082

EDIBLE FOOD PRODUCT

Alfred Rubin, Naperville, Ill.

Application June 25, 1948, Serial No. 35,088

2 Claims. (Cl. 99—137)

The present invention relates to edible food products and has for one of its primary objects the provision of a new and improved confection.

In the past, various types of confections have been developed, some comprising frozen foods and others comprising pastries. Products including both frozen food and pastry are also known, such for example as ice cream rolls, but these have not been produced in such form as to enable them readily to be made or sold as individual portions or in individual containers.

It is an object of the present invention to provide a new and improved frozen food-pastry and, more particularly, one which can be readily packaged in individual containers so that they can be stored in quantity and sold for individual consumption.

Another object of the present invention is to provide a new and improved frozen food-pastry packaged in such manner that the pastry acts as a heat insulating medium, which is a great advantage when the container is held in one's hand, as it generally is when the food is eaten.

A further object of the present invention is the provision of a new and improved frozen food-pastry packaged in a container wherein the pastry acts as a "footing" for the frozen food, which is preferably ice cream, so that the ice cream can be removed more readily from the container without undesirable slipping or sliding around.

A still further object of the present invention is the provision of a new and improved frozen food-pastry packed in a container adapted to be held in a person's hand wherein the pastry is so located in the container as to insulate the frozen food from the hand and serves to act as a footing for the remainder of the food in the container.

Another and more specific object of the present invention is the provision of a new and improved packaged frozen food-pastry comprising a container having a pastry in the lower corner of the package and frozen food located above the pastry and including, if desired, additional pastry above the frozen food. In practice of the invention, the container may be a paper cup, the frozen food may be ice cream, and the pastry may be a doughnut, of which a half is at the bottom of the container and dimensioned to fit closely in the bottom and the other half is at the top and supported by the ice cream.

A further object of the present invention is the provision of a new and improved method of making a food product of the character set forth above.

Other objects and advantages of the present invention will become apparent from the ensuing description of an embodiment thereof, in which reference is had to the accompanying drawing, in which:

Fig. 1 is a perspective view of a food product made in accordance with the present invention, the cover or lid of the container being omitted; and Fig. 2 is a vertical cross sectional view taken along the line 2—2 of Fig. 1.

Referring now to the drawing, it may be noted that the food product of the present invention, which is indicated as a whole by reference character 10, is packaged in an individual container 12. As illustrated, the container includes a wall 14 and a bottom 16 located somewhat above the bottom of the wall. The wall is provided with a peripheral bead 18 near its outer end to receive and to hold a cover or lid, which has not been illustrated but which may be generally in the form of a circular disc having a tab to facilitate removal of the cover.

The food product of the present invention may perhaps best be defined as a frozen food-pastry. As the name indicates, it includes a frozen food, preferably ice cream or the like, and a pastry. The pastry may taken various forms but it is preferred that it be, and it is shown as being, a doughnut.

In accordance with one of the important features of the present invention, the doughnut, which possesses heat insulating properties, is so located within the container that it shields the frozen food from the heat of the consumer's hand and also serves as a footing for the ice cream, thereby to prevent melting of the ice cream and to stabilize the ice cream within the container so that it can be removed more easily.

Referring again to the drawing, which illustrates a presently preferred arrangement of the pastry and frozen food, it may be noted that a doughnut has been divided into two halves, one half 20 of which is disposed at the bottom of the container and the other half 22 of which is disposed at the top of the ice cream 24. The doughnut is dimensioned so that its outside diameter is substantially equal to that of the bottom of the container compartment so that the doughnut extends substantially to the outer lower corner of the compartment, thereby quite effectively to insulate the ice cream from the heat of the consumer's hand.

The doughnut also serves as a footing for the ice cream and, furthermore, the choice of a doughnut type of pastry, which has a central opening, insures that some of the ice cream placed in the container will extend into the opening, as indicated by the reference character 26, thereby additionally to prevent undesired movement of the ice cream and upper doughnut when the food is being consumed.

Using a half doughnut at the top with the other half disposed at the bottom, as is the case with the portion 20 of the doughnut, insures better holding of the ice cream and upper doughnut during eating. In addition, the use of two halves of a doughnut, especially a doughnut covered with icing 28 as illustrated, which may be cocoanut icing, and locating them so that the icing faces the top, adds to the sales appeal of the product. The consumer notices the icing covered doughnut portions and thinks he is getting his money's worth. A considerable quantity of pastry is also included in the product and yet there is considerable ice cream sandwiched between the two portions of the doughnut. The ice cream also extends into the opening of the upper doughnut, as indicated by reference character 30, and thus also adds to the sales appeal.

The product of the present invention can also be made readily. The pastry 20 is first placed in the container. The ice cream, in a generally soft or semi-fluid state, is placed above it and then the pastry 22 is placed on top of the ice cream so that the latter rises in the opening to approximately the level of the top of the doughnut.

It is believed apparent from the foregoing that the frozen food-pastry of the present invention can be made readily and packaged for sale in individual containers. They can be stored in quantity and sold for individual consumption at various places, such as drug stores, confection stands at parks and picnics and the like. The pastry serves as a heat insulating medium preventing the outer portion of the ice cream from melting. This in and of itself prevents the food within the container from tipping as it is dipped out to be eaten. Additional stability is given to the product by the doughnut footing.

While the present invention has been described in connection with the particular details of an embodiment thereof, it should be understood that these details are not intended to be limitative of the invention except in so far as set forth in the accompanying claims.

Having thus described my invention, what I claim as new and desire to secure by Letters Patent of the United States is:

1. A packaged frozen food-pastry including a half doughnut at the bottom of the package with its flat side down, said doughnut-half having an outside diameter substantially equal to that of the diameter of the package, ice cream disposed above the doughnut and extending into the space comprising the hole in said doughnut, said doughnut covering the major portion of the bottom of the package effectively to insulate the ice cream from heat applied to said bottom, and a half doughnut at the top of and supported by the ice cream and also having its flat side down, said ice cream also extending into the space comprising the hole in the upper doughnut.

2. A frozen food-pastry product including a generally cup-like container of heat insulating material, a doughnut mounted at the bottom of said container having an outside diameter approximating that of the cup, ice cream disposed above the doughnut and extending into the space comprising the hole in said doughnut whereby said doughnut is anchored to said ice cream and provides a substantially non-metallic footing for the ice cream in said container to hold the same firmly while eaten from said container, and another doughnut mounted at the top of the ice cream.

ALFRED RUBIN.

REFERENCES CITED

The following references are of record in the file of this patent:

UNITED STATES PATENTS

| Number | Name | Date |
| --- | --- | --- |
| 1,802,306 | Baker | Apr. 21, 1931 |
| 1,869,464 | Clark | Aug. 2, 1932 |
| 1,893,842 | Nehf | Jan. 10, 1933 |
| 1,899,511 | Leaf | Feb. 28, 1933 |

OTHER REFERENCES

"The Novelty," The Ice Cream Review, October 1942, pages 32, 33, 79, and 80.

Certificate of Correction

Patent No. 2,511,032                          June 13, 1950

ALFRED RUBIN

It is hereby certified that errors appear in the printed specification of the above numbered patent requiring correction as follows:

Column 2, line 28, for the word "taken" read *take*; column 4, line 29, for "non-metallic" read *non-meltable*;

and that the said Letters Patent should be read with these corrections therein that the same may conform to the record of the case in the Patent Office.

Signed and sealed this 19th day of September, A. D. 1950.

[SEAL]

THOMAS F. MURPHY,
*Assistant Commissioner of Patents.*